United States Patent
Sugiura et al.

(10) Patent No.: US 6,246,564 B1
(45) Date of Patent: Jun. 12, 2001

(54) ACTIVATING DEVICE

(75) Inventors: Tokihiko Sugiura, Kyoto; Tetsuo Takano; Shinji Miura, both of Nagano; Yoshihiro Ikushima, Iida, all of (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/344,483

(22) Filed: Jun. 25, 1999

(30) Foreign Application Priority Data

Jun. 26, 1998 (JP) .................................................. 10-181066

(51) Int. Cl.⁷ .................................................. H01H 47/00
(52) U.S. Cl. .......................... 361/166; 361/167; 361/191; 361/210; 307/10.1; 307/125
(58) Field of Search .......................... 361/160, 166–167, 361/170, 189–191, 210; 307/9.1, 10.1, 112, 115–116, 125; 318/445, 453–454, 280–286

(56) References Cited

U.S. PATENT DOCUMENTS

| | | | |
|---|---|---|---|
| 4,394,605 | * 7/1983 | Terazawa | 318/280 |
| 5,994,797 | * 11/1999 | Yamaoka | 307/125 |
| 6,111,326 | * 8/2000 | Miyata et al. | 307/10.1 |

* cited by examiner

Primary Examiner—Michael J. Sherry

(57) ABSTRACT

An actuating device for a motor used in a power window of an automobile which can drive the motor reliably to open the window even when the automobile is submerged in water. This device has a simple configuration is relatively small and inexpensive. This activating device comprises a drive circuit for a motor which has first and second relays to allow electric current to flow so as to drive the motor in either the forward or reverse direction. The contact of the second relay, which drives the motor in one direction, is used in such a way that the contact forms a part of an electronic circuit for the magnetic coil of the first relay. When the second relay operates, the electric circuit for the magnetic coil of the first relay is closed off. This activating device can ensure that a power window will be opened even if the automobile is submerged, and the first and second relay are switched ON at the same time.

17 Claims, 4 Drawing Sheets

ACTIVATING DEVICE

BACKGROUND OF THE INVENTION

1. Field of the Invention

This invention concerns an activating device having an electric circuit to switch ON and OFF any kind of electric device, such as a motor driven device. More specifically, it concerns an activating device having an electric circuit to switch any type of switching system in which at least one switching unit among a plurality of switching units must be switched ON or OFF safely without failure. For example, the activating device of this invention could be used to switch a motor ON and OFF to open and close power windows in an automobile, even when that automobile is submerged in water.

2. Background of the Invention

Most motor drive systems for opening and closing power windows in automobiles have an electronic control system capable of an automatic reverse function for the power windows and a multiplex communication control function. The motor serves as the drive source for the power windows. The most common way to supply appropriate power to the motor and to control its operation is to use a drive method using relays. Typical configurations of motor drive devices of the prior art are shown in FIGS. 3 and 4.

In the conventional motor drive device according to the prior art, the motor activating device for an automobile power window has two relays, a first relay 2 and a second relay 3, for supplying power to the motor 1. The first relay 2 drives the motor in reverse (as when closing the window of an automobile), while the second relay 3 drives the motor in a forward direction (as when opening the window of an automobile). Two operating switches, a first operating switch 4 and a second operating switch 5, activate the motor 1 to operate the power window in the close and open directions.

The first and second relays 2 and 3 include coils 2a and 3a, respectively, which create magnetic force, and first and second contacts 2b and 3b, respectively. The first and second contacts 2b and 3b each have a common terminal C, a normal open terminal (N.O. terminal) and a normal close terminal (N.C. terminal). When the electric current is not flowing through the first and second coils 2a and 3a so that the relays are not in operation, the C terminals and the N.C. terminals are in contact with each other. When electric current is flowing through the first and second coils 2a and 3a, the C terminals and the N.O. terminals are in contact with each other.

The N.O. terminals of the first and second relays 2 and 3 are connected to a power supply E, typically the automobile battery, while the N.C. terminals are connected to ground. The C terminal of first relay 2 is connected to the reverse terminal of the motor where the motor closes the window if the terminal is connected to the power supply side. The C terminal of second relay 3 is connected to the forward terminal of the motor. The motor opens the window if the forward terminal is connected to the power supply side.

The first and second operating switches 4 and 5, respectively, each have a contact which is actuated when the driver operates the switches. A rotating switch unit is typically used for these two operating switches 4 and 5. The operating switch 4 will go ON if the rotating switch rotates in one direction for closing the automobile window, while switch 5 will go ON if it rotates in the other direction for opening the automobile window.

In the configuration shown in FIG. 3, the first and second coils 2a and 3a of first and second relays 2 and 3 can be connected to a line from the power supply by means of the operating switches 4 and 5. Making and breaking the respective switching contact of the operating switches directly opens and closes this line from the power supply. In another configuration as shown in FIG. 4, the operating switches 4 and 5 are provided in the ground line of the first and second coils 2a and 3a of the first and second relays 2 and 3. This configuration is also of the type in which the switching contact directly opens or closes the connection between each relay coil and the ground line.

In both the configurations shown in FIGS. 3 and 4, there are two ON-OFF transistors, (11 and 12 in FIG. 3, and 11a and 12a in FIG. 4), and a signal processor (13 in FIG. 3 and 13a in FIG. 4), which causes the motor to run in a given direction based on a remote signal from a remote window opener or on a particular situation at a given moment, and which outputs a drive signal to actuate one of the aforesaid transistors. These transistors and the signal processor are on either the ground or power supply side of the first and second coils 2a and 3a of the first and second relays 2 and 3. Signal processor 13 (or 13a) is typically a single-chip microprocessor. In the circuit in FIG. 3, it drives transistors 11 and 12 through transistors 14 and 15.

In this configuration, the input lines (16 and 17 in FIG. 3 and 16a and 17a in FIG. 4) connect one terminal of the first and second operating switches 4 and 5 to the input terminal of the signal processor 13, which monitors the open/closed state (i.e., the ON/OFF state) of the operating switches 4 and 5.

In both FIGS. 3 and 4, an automatic mode switch 18 inputs an "automatic window close" command to signal processor 13 in response to the actuation of an automatic operating unit.

In the drive circuits described above, the drive operation of the motor 1 is directly controlled by opening or closing one of the terminals for the coils 2a and 3a in the relays 2 and 3, respectively. This control is performed by the operating switch 4 or S.

When the first operating switch 4 is actuated and its contact closes, the voltage from the power supply E causes current to flow into the first coil 2a, which magnetizes the first relay 2, thereby causing only the first contact 2b to operate. When the first operation switch 4 is activated, only the reverse terminal la of the motor is connected, through the C and N.O terminals of first contact 2b, to the power supply E, so the motor runs in reverse, causing the automobile window to close.

When the switch 5 is actuated and its contact closes, the voltage from the power supply E causes current to flow into the second coil 3a, which magnetizes the second relay 3, thereby causing only the second contact 3b to operate. In this case, only the forward terminal 1b of the motor is connected, through the C and N.O terminals of the second contact 3b, to the power supply E, so the motor runs forward, causing the automobile window to open.

With the drive circuits described above, the signal processing function of the signal processor 13 (or 13a) allows the operation of the motor 1 in a specified direction to be controlled in response to a radio signal input from the exterior even though neither the operating switch 4 nor switch 5 has been actuated, i.e., the motor is remotely controlled.

The signal processor 13 (or 13a) reads the current value and rpm of the motor 1 while it is running in reverse (i.e., while the window is closing). If the signal processor determines from the current value and other data that the window is jammed, the signal processing function of the signal processor 13 (or 13a) forces the motor 1 to run forward and open the window even though the switch 5 has not been actuated (auto-reverse function).

If the automatic switch 18 is actuated, the signal processing function of the signal processor 13 (or 13a) will cause the motor 1 to automatically reverse until it is predetermined, via a detection signal from a limit switch (not shown), that the window is completely closed (automatic close function).

When the signal processor 13 (or 13a) must the drive motor 1 in the forward direction in order to execute the aforesaid remote control or auto-reverse function, it outputs a drive signal only to the transistor 12 (or 12a) to switch the transistor ON. When the transistor 12 (or 12a) goes ON, as can be seen in FIGS. 3 and 4, current flows into the second coil 3a of the second relay 3 without the operation of the second operating switch 5. The second contact 3b is actuated and the motor 1 operates in the forward direction to open the window.

When the signal processor 13 (or 13a) must drive the motor 1 in reverse in order to execute the aforesaid communication control or automatic close function or the like, it outputs a drive signal only to the transistor 11 (or 11a) to switch the transistor ON. When the transistor 11 (or 11a) goes ON, as can be seen in FIGS. 3 and 4, current flows into the first coil 2a of the first relay 2 regardless of the operating state of the first operating switch 4. The first contact 2b is actuated and the motor 1 operates in reverse to close the window.

With the activating device for a motor which is described above, if the automobile plunges into the ocean or a lake and the activating device is immersed, the water may cause current to flow (in other words, leak) to the contacts of the first and second operating switches 4 and 5 even though the driver did not actuate the switches. In that case, even if the second operating switches 4 and 5 are actuated, the motor 1 will not run in either direction.

In other words, if the water has a sufficient electrolyte concentration, both the first and second operating switches 4 and 5 will close so that the leakage current will flow into both of the first and second coils 2a and 3a. If this leakage current is sufficiently large, the first and second contacts 2b and 3b of the first and second relays 2 and 3 will be both actuated. As a result, both of the terminals 1a and 1b of the motor 1 will be connected to the power supply. If thereafter the first and second operating switches 4 and 5 are actuated manually, or the signal processor 13 (or 13a) outputs a drive signal to one of the transistors, the motor 1 will remain inoperable because the motor 1 will no longer have a ground connection, and the state of the circuit constituting the channel which leads to the motor 1 will remain unchanged.

It is conceivable that the aforesaid problem could be addressed by making sure that the first and second operating switches 4 and 5 have a watertight design. However, in practical terms this is far from easy to accomplish. Operating switches 4 and 5 must have contacts which are operated mechanically by a pushbutton unit which must remain exposed in the driver's compartment. This makes it difficult to mold the contacts, because the configuration required to provide a watertight seal is extremely complicated.

The present applicants previously solved the problem which occurs as described above when an automobile is submerged by providing an actuating device for a motor with an interlock switch system. When one of the relays is actuated, both terminals of the coil in the other relay are shorted to insure that it is not possible to actuate that relay.

However, interlocking the operation of an ordinary switch so that the terminals of the coil in the other relay are shorted requires a new switch contact. This makes the configuration which contains the operating unit and the switch contacts more complex, with the result that the device must be somewhat bulkier and more expensive.

SUMMARY OF THE INVENTION

An objective of an embodiment of the present invention is to provide an actuating device for a motor which can drive the motor reliably even when the automobile is submerged. This device may also have a simple configuration and be relatively small and inexpensive.

Thus, an object of an embodiment of this invention is to overcome problems with the power windows of an automobile which must be opened by the driver's own operation or the automatic operation at the time of an automobile accident in which the automobile has plunged into a body of water, and the switching system for the power windows becomes wet in the water. The activating device according to an embodiment of this invention may activate the switching system ON or OFF safely with a simple, small and inexpensive configuration.

An activating device according to an embodiment of this invention comprises a drive circuit for, for example, a motor which has two relays (first and second relays) to allow electric current to flow so as to drive a motor in either the forward or reverse direction. The contact of the second relay which drives the motor in one direction is used in such a way that the contact forms a part of an electronic circuit for the first magnetic coil of the first relay. When the second relay operates, therefore, the electric circuit for the magnetic coil of the first relay is closed off.

In an embodiment of this invention the activating device is configured as follows. The reverse terminal of a motor is connected to the ground through the contact of the first relay (C-N.C) when the first relay is not in operation, and it is switched to the power supply through the contact of the first relay (C-N.O) when the relay is in operation. The forward terminal of a motor is connected to the ground through the contact of the second relay (C-N.C) when the second relay is not in operation, and it is connected to the power supply through the contact of the second relay (C-N.O) when the relay is in operation. In this embodiment the ground terminal of a first magnetic coil in the aforesaid first relay is connected to the ground through the (C-N.C) contacts of the aforesaid second relay when the second relay is not operating. When the aforesaid second relay is activated and the forward terminal of the motor is switched to the second (C-N.O) contacts of the second relay to the power supply, the ground line for the first coil of the first relay is closed off.

If the first relay is used for closing the window, the second relay is used for opening the window, and if both relays are immersed in water, such as during an accident, a current leak occurs in both relays. If the first relay is activated first, and the second relay is activated second, the window may begin to close at the first activation for a short time. However, the window may begin to open immediately after the second relay is immersed or the second operating switch (for opening the window) is switched ON by the driver, because this causes the circuit to the ground for the first relay (for closing the window) to close OFF. By the manner mentioned above, this activating device ensures that the window will open in an emergency case, such as when an automobile plunges into the water.

This invention may be used not only for power windows, doors, and sunroofs of an automobile, but also for any type of opening system in an automobile. This invention is further useful in any kind of facility or craft where the people in the facility must be released to the outside by opening a door, or other type of obstacle which allows escape to the outside in case of an emergency. For example this invention may be used on an aircraft or a ship.

According to an embodiment of the invention, an activating device to activate an electric device in forward or reverse direction by a plurality of relays is provided. The activating device includes a first relay including a first coil, in the plurality of relays, which activates the electric device in reverse direction, and a second relay in the plurality of relays which activates the electric device in forward direction, wherein an unactivated relay switch position of the second relay forms a part of a continuous electric circuit of the first coil of the first relay, which continuous electric circuit is broken when the second relay is activated.

The electric device may be a motor and the activating device may be a motor drive device for driving the motor to rotate in forward or reverse direction. The forward direction may open an automobile window.

The activating device may also include a first normal close terminal of the first relay, a first normal open terminal of the first relay, a second normal close terminal of the second relay, a second normal open terminal of the second relay, a first ground terminal for the first coil of the first relay, and a power supply, wherein the first normal close terminal is connected to ground when the first relay is inactivated, and the first normal open terminal is connected to the power supply when the first relay is activated, wherein the second normal close terminal is connected to ground when the second relay is inactivated, and the second normal open terminal is connected to the power supply when the second relay is activated, and wherein the first ground terminal is connected to the ground via the second normal close terminal when the second relay is inactivated, and the first ground terminal is disconnected from the ground when the second relay is activated thereby switching a ground line for the first coil to the power supply. The activating device may also include a first operation switch for connecting the power supply to a power supply terminal of the first coil, and a second operation switch for connecting the power supply to a power supply terminal of the second coil, and for connecting the second normal open terminal to a ground terminal of the first coil.

The activating device may also include a first transistor which connects the first coil to the power supply when the first transistor is ON, a second transistor which connects the second coil to the power supply when the second transistor is ON, and a signal processor connected to the first and second transistor for driving the first or second transistor ON, wherein the signal processor drives the first or second transistor ON according to a remote signal.

The electric device may be a power motor of an automobile for opening and closing an automobile facility. The automobile facility may be a power window, and the power window may open when the power motor is driven in the forward direction. The automobile facility may be a sun roof. The automobile facility may be opened when the second relay is activated.

The electric device may be a power motor for opening and closing a facility. The facility may be an emergency facility for an aircraft. The facility may be an emergency facility for a ship.

The activating device may include a diode between and connected to the first coil and a common terminal of said second relay for allowing current in only one direction in the continuous electric circuit.

According to another embodiment, a method of activating an electronic device in forward or reverse direction is provided. The method includes activating a first circuit to thereby activate an electronic device in a first direction, and activating a second circuit to thereby activate an electronic device in a second direction, and at the same time preventing the first circuit from activating by preventing the first circuit from making a continuous electric circuit.

The activating the first circuit step of the method may include activating a first operating switch to connect a first coil of a relay in the first circuit to a power supply. The activating the second circuit step of the method may include activating a second operating switch to connect a second coil of a relay of the second circuit to a power supply, and to prevent connection of the first coil of the first circuit relay to ground. The method may also include preventing current from flowing in more than one direction in the first coil.

DETAILED DESCRIPTION OF THE PREFERRED EMBODIMENT

In this section two preferred embodiments of this invention are described with reference to the drawings.

First Embodiment

Figure 1:
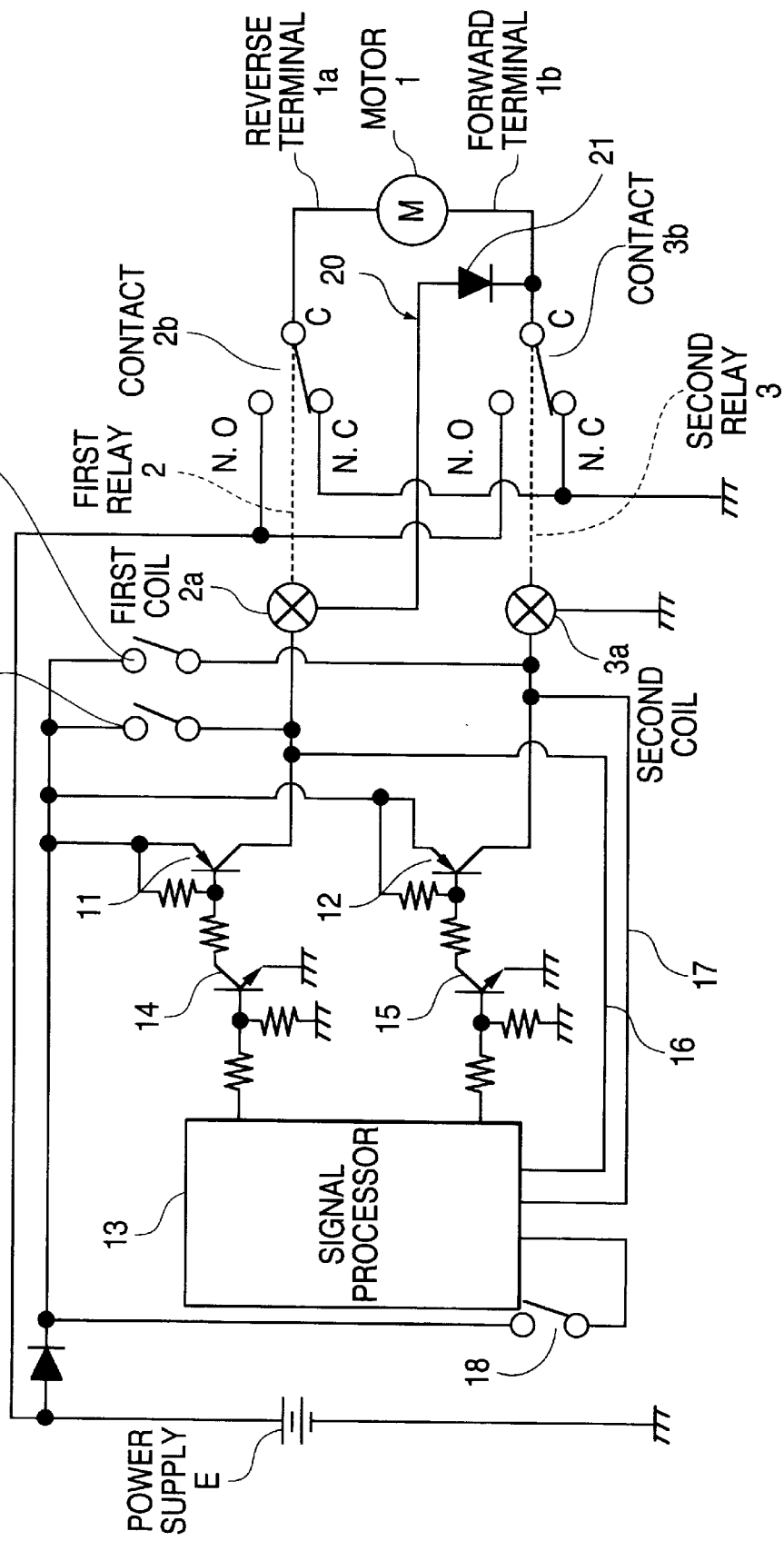
FIG. 1 is a first diagram showing the main components of a circuit according to a first preferred embodiment of the activating system of this invention for driving a window motor.

A first embodiment of this invention shall be described with reference to FIG. 1. FIG. 1 is a diagram showing the main components of a circuit according to this first embodiment of the activating device for driving a window motor for an automobile. The drawing does not show the external appearance of this device nor its switch operating unit.

Figure 3:
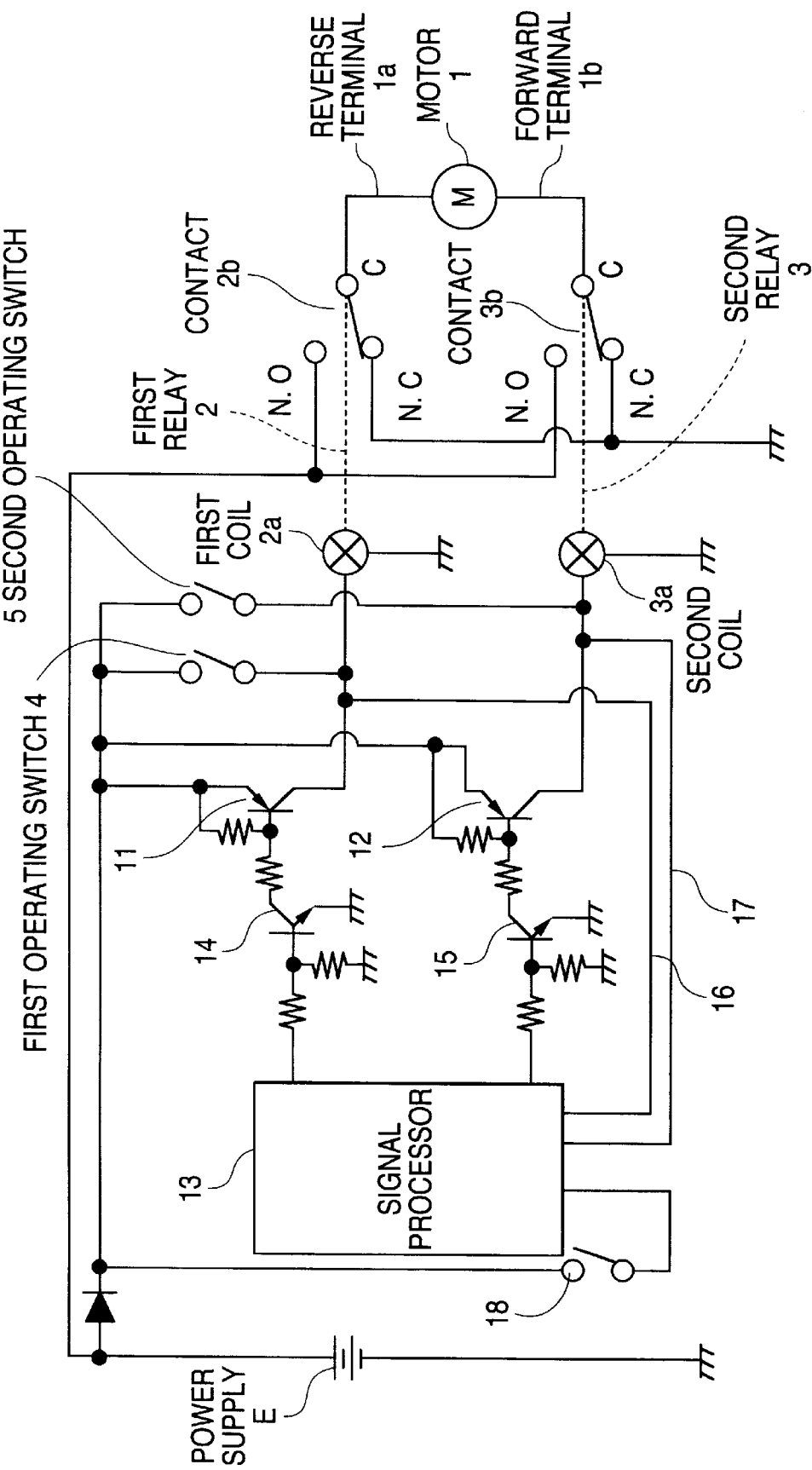
FIG. 3 is a diagram of a conventional activation system for driving a window motor.

Since this preferred embodiment of the device has a similar configuration to the prior art discussed above which is shown in FIG. 3, the same identifying numbers for components which are used in that figure are used in FIG. 1.

In this first preferred embodiment of an actuating device for a motor, the contact 3b of the second relay 3, which operates the motor in the forward direction (i.e., the direction which opens the window or sunroof), is connected in such a way as to constitute one portion of a current circuit (in this case, a ground circuit side) to the first coil 2a in the first relay 2. When the second relay 3 is activated, the current circuit to the first coil 2a of the first relay 2 is closed off.

To be more specific, the ground terminal of the first coil 2a and the C terminal of the second contact 3b are connected via the line 20. The ground terminal of the first coil 2a is connected to the ground via the line 20 and the C and N.C terminals of the contact 3b of the second relay 3. The current circuit for the first coil 2a of the first relay 2 is connected to the ground in this manner.

In other words, when the device is not in operation, the ground line of the first coil 2a of the first relay 2 is connected via the contact 3b (C-N.C terminals) of the second relay 3 to the ground. When the second relay 3 operates, the ground line of the first coil 2a is switched to power supply E via the second contact 3b (C-N.O) of the second relay 3, and the circuit from the first coil 2a to the ground is closed off.

When the second relay 3 is operated, a diode 21 prevents reverse current from flowing into the line 20 so that voltage cannot be applied to the first coil 2a via the contact 3b of the second relay 3 and the line 20.

In the actuating device for a motor configured as described above, either the operating switch 5 is actuated to cause the forward rotation of the motor 1 (which, in this case, opens the window or sunroof), or the control function of the signal processor 13 causes the transistor 12 to go ON, thereby causing the forward rotation of the motor 1. When current flows to the second coil 3a and the second relay 3 operates, the C and N.O terminals form a continuous circuit at the second contact 3b of the second relay 3. The ground terminal of the coil 2a of the first relay 2 is switched to the power supply E via the line 20 and the second contact 3b (the C-N.O terminals), and this results in the ground circuit of the coil 2a being cut off.

If there is current leakage in the operating switch 4 because the automobile is under water, and a circuit is created to the operating switch 4 contrary to what is desired at that moment, current will be prevented from flowing into the first coil 2a of the first relay 2 for closing the window. This design will reliably prevent the situation in which the water causes the first relay 2 to operate simultaneously with the second relay 3 so that it becomes impossible for the motor to operate properly.

Even if the automobile is under water, the second contact 3b of the second relay 3 will reliably operate, by itself, so that the motor 1 can be made to run forward to open the window. The reliability of manual operation for opening the window as well as the automatic reverse function initiated by the signal processor 13 is extremely high even when the automobile becomes submerged.

If the actuating device of this embodiment is used to drive a motor which opens and closes the power windows or the sunroof in an automobile, the operation which opens the windows or sunroof remains possible even when the automobile is under water. The driver and passengers may more easily escape from the vehicle, and safety is thereby improved.

This embodiment has an extremely simple circuit configuration which is improved merely by adding the line 20 and the diode 21. Since the operation of the motor in rotating in the forward direction remains reliable even if the automobile is submerged, safety can be guaranteed with respect to accidents involving driving into the water. In addition, the simple design allows the device to be made smaller and at a lower cost.

Second Embodiment

Figure 2:
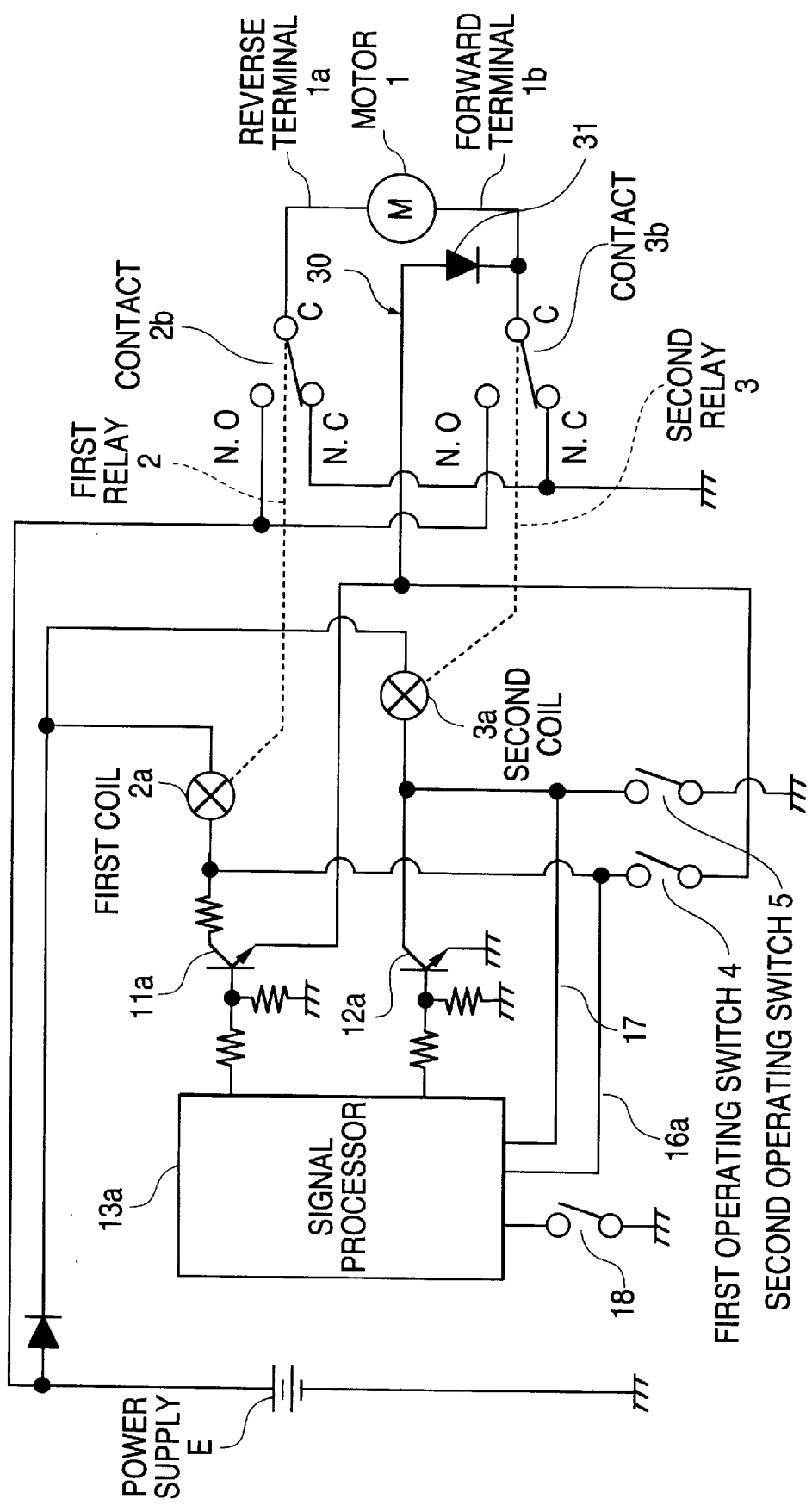
FIG. 2 is a second diagram showing the main components of a circuit according to a second preferred embodiment of the activating system of this invention for driving a window motor.
Figure 4:
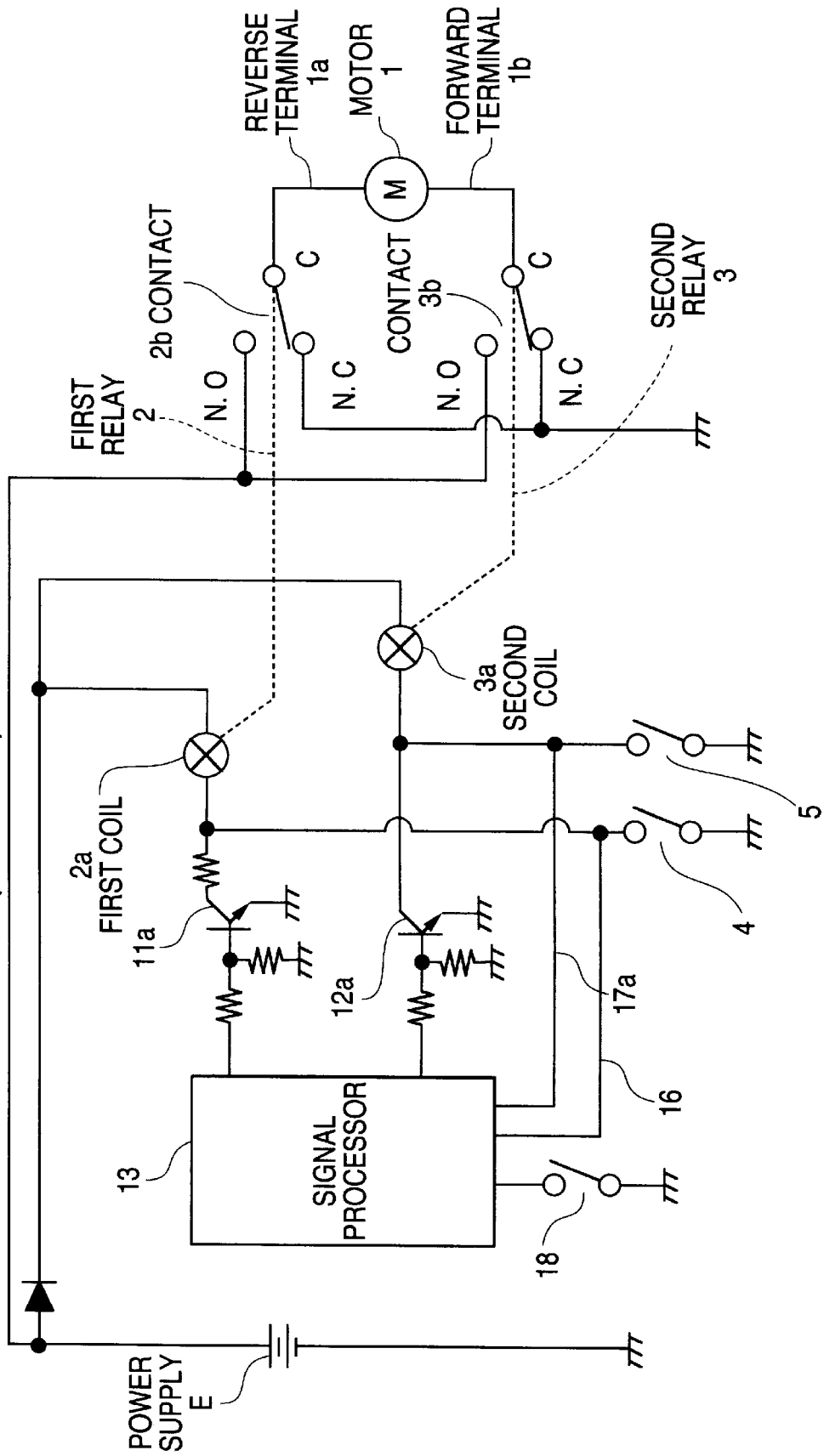
FIG. 4 is a diagram of a another conventional activation system for driving a window motor.

The second preferred embodiment of this invention shall be described with reference to FIG. 2. Since this embodiment of the device has a similar configuration to the device discussed above which is shown in FIG. 4, the same identifying numbers for components which are used in that figure are used in FIG. 2.

In this embodiment of an actuating device for a motor, just as in the first preferred embodiment, the contact 3b of the second relay 3, the relay which operates the motor in the forward direction, is connected in such a way that it forms a continuous circuit to the ground for the first coil 2a of the first relay 2. When the second relay 3 operates, the circuit to the coil 2a is closed off as in the first preferred embodiment.

To be more specific, the ground terminals of the first operating switch 4 and the transistor 11a, which are connected to the ground terminal of the first coil 2a, are connected via the line 30 to the C terminal of the contact 3b. The ground terminals of the first operating switch 4 and the transistor 11a are connected to the ground via line 30 and the C and N.C terminals of the contact 3b of the second relay 3. This forms a continuous ground circuit for the first coil 2a.

A diode 31, which prevents the flow of reverse current, is provided on line 30 in order to prevent voltage from being applied to the transistor 11a by way of the contact 3b of the second relay 3 and the line 30 when the second relay 3 operates.

In this embodiment of an actuating device for a motor, which is configured as described above, when the second relay 3 operates, the C and N.O terminals of the contact 3b form a continuous current circuit just as in the first preferred embodiment. Thus, the ground side of the first coil 2a (i.e., the operating switch 4 and the ground terminal of the transistor 11a) are connected to the power supply E via the line 30 and the contact 3b, and the current circuit on the ground side of the coil 2a is closed off by the contact 3b.

Even if the automobile is under water, the contact 3b of the relay 3 will reliably operate, by itself, so that the motor 1 can be made to run forward for opening the window. Thus, the reliability of the manual operation which opens the window as well as that of the automatic reverse function initiated by the signal processor 13 is extremely high even if the automobile is under water.

This embodiment has an extremely simple circuit configuration which is improved merely by adding the line 30 and the diode 31. Since the motor can be reliably operated to rotate in the forward direction even if the automobile is submerged, safety can be guaranteed with respect to accidents involving driving into the water. In addition, the simple design allows the device to be made smaller and at a lower cost.

This invention is not limited to the embodiments just described, but can be applied in a variety of situations and with various modifications.

For example, in the embodiments described above, a connector line 30 is provided only for first coil 2a in the first relay 2, which drives the motor 1 in reverse. This improves the reliability of the operation which drives the motor forward (i.e., in the direction which opens the window or sunroof). However, it would be equally possible to provide the same sort of connector line 30 for the second coil 3a of the second relay 3, the relay which drives the motor 1 forward. Then the ground circuit of the second coil 3a could go through the first contact 2b, which would improve the reliability of the operation which drives the motor 1 in reverse (i.e., in the direction which closes the window or sunroof).

In the embodiments described in the first and second preferred embodiments, the contact 3b of the second relay 3, the relay which drives the motor in the forward direction, is connected in such a way as to form a ground circuit for the first coil 2a of the other relay, first relay 2. Then when the second relay 3 operates, the ground circuit for the first coil 2a of the first relay 2 is closed off. However, the invention is not limited to this configuration only. Theoretically, the following arrangement is also possible. When neither relay contact is operating, both of the motor terminals are connected to the power supply. When one of the relays operates, one of the motor terminals will be connected to ground so that the motor will operate in the specified direction. In this configuration, the contact of one of the relays is connected so as to form a current circuit to the power supply line (instead of the ground line) of the coil for the other relay. In other words, when the device is not operating, the terminal on the power supply line of the coil for the first relay is connected to the power supply through the contact for the coil of the second relay. When the second relay operates, the current circuit on the power supply line of the coil for the first relay is closed off.

With this sort of configuration, when the current circuit on the power supply line of the coil for the first relay is closed off, a single relay (in this case, the second relay) can operate accurately even if the automobile is under water, so the motor can be driven in the specified direction with extremely high reliability.

However, with this arrangement, the motor coil will be in a state of high potential even when it is not operating. Since this will require measures to prevent ground faults, it is not a preferred design, and the embodiments described in the first and second preferred embodiments are preferable.

In the actuating device for a motor disclosed above, when one relay operates, the current circuit to the coil of the other relay is closed off. For example, the actuating device is not operating, and the ground line of the coil for one relay is connected to the ground through the contact of the other relay. When one relay operates, the ground circuit for the coil of the other relay is closed off.

An inflow of water may cause leakage current to flow in the switch which operates one of the relays at the same time that current is flowing into the coil of the other relay. This will cause the first switch to have an inappropriate current circuit. However, the current will cease to flow into the coil of the second relay at the moment the first relay begins to operate. This will eliminate the situation which sometimes occurs when an automobile is submerged and the water causes both relays to operate simultaneously, thus preventing the motor from operating properly.

Even when an accident causes the automobile to be submerged under water, a single relay will continue to operate accurately so that the motor can be driven in a specified direction. This insures that the motor will operate with high reliability.

The characteristic components of this invention can be achieved simply, merely by changing the way the conductors and wiring are connected in the circuit so that the contact of one of the relays forms part of the current circuit to the coil of the other relay. The design does not require any new switches. Thus, in addition to providing improved safety with respect to being under water, this design allows the circuit to be made smaller and to be produced at a lower cost.

With the device to drive a motor in this application, the contacts of both relays connect the motor terminals to the ground when the device is not operating. Thus the potential of the motor coil is at ground level when the motor is not operating, a practical arrangement in terms of ground fault protection.

As is disclosed in this application, when the actuating device of this invention is applied to the motor which drives a part that opens and closes in an automobile (a power window or sunroof), the operation that opens or closes that part will still be possible when the automobile is submerged under water.

If the direction in which the motor is driven when the first relay of this invention operates is the one which causes the window or sunroof to open, the reliability of the device will be improved with respect to opening the windows or sunroof if the automobile is submerged. The operation of the motor which opens these parts will still be possible even when an accident results in the automobile being under water. Thus, the driver and passengers can easily escape from the passenger compartment, and the safety of the automobile is improved.

We claim:

1. An activating device to activate an electric device in forward or reverse direction by a plurality of relays, comprising:
    a first relay including a first coil, in said plurality of relays, which activates said electric device in reverse direction; and
    a second relay in said plurality of relays which activates said electric device in forward direction;
    wherein an unactivated relay switch position of said second relay forms a part of a continuous electric circuit of said first coil of said first relay, which continuous electric circuit is broken when said second relay is activated.

2. An activating device according to claim 1, wherein said electric device is a motor and said activating device is a motor drive device for driving said motor to rotate in forward or reverse direction.

3. An activating device according to claim 1, wherein said forward direction opens an automobile window.

4. An activating device according to claim 2, further comprising:
    a first normal close terminal of said first relay;
    a first normal open terminal of said first relay;
    a second normal close terminal of said second relay;
    a second normal open terminal of said second relay;
    a first ground terminal for said first coil of said first relay; and
    a power supply;
    wherein the first normal close terminal is connected to ground when the first relay is inactivated, and the first normal open terminal is connected to the power supply when the first relay is activated;
    wherein, the second normal close terminal is connected to ground when the second relay is inactivated, and the second normal open terminal is connected to the power supply when the second relay is activated;
    wherein the first ground terminal is connected to the ground via the second normal close terminal when the second relay is inactivated, and the first ground terminal is disconnected from the ground when the second relay is activated thereby switching a ground line for the first coil to the power supply.

5. An activating device according to claim 2, wherein said motor is a power motor of an automobile for opening and closing an automobile facility.

6. An activating device according to claim 5, wherein said automobile facility is a power window.

7. An activating device according to claim 5, wherein said automobile facility is a sun roof.

8. An activating device according to claim 5, wherein said automobile facility is opened when said second relay is activated.

9. An activating device according to claim 2, wherein said motor is a power motor for opening and closing a facility.

10. An activating device according to claim 9, wherein said facility is an emergency facility for an aircraft.

11. An activating device according to claim 9, wherein said facility is an emergency facility for a ship.

12. An activating device according to claim 1, further comprising:
- a diode between and connected to said first coil and a common terminal of said second relay for allowing current in only one direction in said continuous electric circuit.

13. An activating device according to claim 4, further comprising:
- a first operation switch for connecting the power supply to a power supply terminal of the first coil; and
- a second operation switch for connecting the power supply to a power supply terminal of the second coil, and for connecting the second normal open terminal to a ground terminal of the first coil.

14. An activating device according to claim 4, further comprising:
- a first transistor which connects the first coil to the power supply when the first transistor is ON;
- a second transistor which connects the second coil to the power supply when the second transistor is ON; and
- a signal processor connected to the first and second transistor for driving the first or second transistor ON, wherein the signal processor drives the first or second transistor ON according to a remote signal.

15. A method of activating an electronic device in forward or reverse direction comprising:
- activating a first circuit to thereby activate an electronic device in a first direction; and
- activating a second circuit to thereby activate an electronic device in a second direction, and at the same time preventing the first circuit from activating by preventing the first circuit making a continuous electric circuit.

16. A method according to claim 15, wherein the activating the first circuit step further comprises activating a first operating switch to connect a first coil of a relay in the first circuit to a power supply; and
- wherein the activating the second circuit step further comprises activating a second operating switch to connect a second coil of a relay in the second circuit to a power supply, and to prevent connection of the first coil of the first circuit relay to ground.

17. A method according to claim 16, further comprising the step of preventing current from flowing in more than one direction in said first coil.

* * * * *